US011157155B2

(12) United States Patent
Giona

(10) Patent No.: US 11,157,155 B2
(45) Date of Patent: Oct. 26, 2021

(54) AIR LINE DISPLAYING METHOD, APPARATUS AND SYSTEM, GROUND STATION AND COMPUTER-READABLE STORAGE MEDIUM

(71) Applicant: Autel Robotics Europe GmbH, Ismaning (DE)

(72) Inventor: Roberto Giona, Ismaning (DE)

(73) Assignee: AUTEL ROBOTICS EUROPE GMBH, Ismaning (DE)

( * ) Notice: Subject to any disclaimer, the term of this patent is extended or adjusted under 35 U.S.C. 154(b) by 0 days.

(21) Appl. No.: 16/560,106

(22) Filed: Sep. 4, 2019

(65) Prior Publication Data

US 2020/0174650 A1   Jun. 4, 2020

(30) Foreign Application Priority Data

Aug. 16, 2018   (DE) .......................... 102018120010.2

(51) Int. Cl.
*G06F 3/0484* (2013.01)
*G08G 5/00* (2006.01)
*B64C 39/02* (2006.01)

(52) U.S. Cl.
CPC ....... *G06F 3/04847* (2013.01); *G08G 5/0013* (2013.01); *G08G 5/0026* (2013.01); *G08G 5/0069* (2013.01); *B64C 39/024* (2013.01); *B64C 2201/027* (2013.01)

(58) Field of Classification Search
CPC .......................... G06F 3/04847; G08G 5/0013; G08G 5/0069; G08G 5/0039; G08G 5/0052; G08G 5/0034; G08G 5/0026; B64C 39/024; B64C 2201/027
See application file for complete search history.

(56) References Cited

U.S. PATENT DOCUMENTS 4,021,009 A * 5/1977 Baker ................. G05D 1/0607
                                                244/180
9,224,302 B1 * 12/2015 Young .................. G08G 5/0021
9,588,516 B1 * 3/2017 Gurel ...................... G06T 5/002
(Continued)

FOREIGN PATENT DOCUMENTS

CN   105518415 A   4/2016
CN   107943082 A   4/2018

OTHER PUBLICATIONS

"EBee senseFly Extended User Manual" senseFly, Dec. 14, 2014 Revision 14, p. 58-59 (Year: 2014).*

(Continued)

*Primary Examiner* — Shen Shiau

(57) ABSTRACT

The present disclosure provides an air line displaying method and a ground station. The method includes: displaying a first air line view, the first air line view including height information of at least one waypoint in an air line; when detecting a first operation performed by a user on a waypoint of the at least one waypoint, adjusting height information of the waypoint; and sending adjusted height information of the waypoint to an aircraft. By adjusting the air line view through human-computer interaction, the air line view displayed by the ground station can be edited. This makes it convenient for the user to adjust the air line and further enables the aircraft to receive a new air line in time, thereby facilitating flight of the aircraft.

16 Claims, 8 Drawing Sheets

(56) References Cited

U.S. PATENT DOCUMENTS

| | | | | |
|---|---|---|---|---|
| 10,540,902 | B2* | 1/2020 | Kneuper | G06T 11/206 |
| 10,692,387 | B2* | 6/2020 | Zhang | B64D 43/00 |
| 10,854,092 | B1* | 12/2020 | Subramaniyan | G08G 5/003 |
| 2009/0319100 | A1* | 12/2009 | Kale | G08G 5/0021 |
| | | | | 701/4 |
| 2013/0204470 | A1* | 8/2013 | Luckner | B64C 9/20 |
| | | | | 701/18 |
| 2014/0316616 | A1* | 10/2014 | Kugelmass | G06T 11/206 |
| | | | | 701/8 |
| 2014/0365041 | A1* | 12/2014 | Deker | G08G 5/003 |
| | | | | 701/4 |
| 2015/0260525 | A1* | 9/2015 | Parthasarathy | G08G 5/0039 |
| | | | | 701/538 |
| 2015/0355832 | A1* | 12/2015 | Dostal | G01C 21/00 |
| | | | | 715/771 |
| 2016/0194079 | A1* | 7/2016 | Montreuil | G05D 1/0011 |
| | | | | 701/2 |
| 2016/0284221 | A1* | 9/2016 | Hinkle | B64C 39/024 |
| 2016/0306351 | A1* | 10/2016 | Fisher | G05D 1/0016 |
| 2016/0307447 | A1* | 10/2016 | Johnson | G08G 5/0069 |
| 2017/0083027 | A1* | 3/2017 | Tao | B64C 39/024 |
| 2017/0108857 | A1* | 4/2017 | Line | A63H 30/04 |
| 2017/0185259 | A1* | 6/2017 | Chen | G06F 3/04883 |
| 2017/0221368 | A1* | 8/2017 | Zhang | G08G 5/0034 |
| 2017/0229022 | A1* | 8/2017 | Gurel | G06T 5/002 |
| 2017/0229026 | A1 | 8/2017 | Kneuper et al. | |
| 2017/0249849 | A1* | 8/2017 | De Prins | G01C 23/005 |
| 2017/0334559 | A1* | 11/2017 | Bouffard | G08G 5/0082 |
| 2018/0204469 | A1* | 7/2018 | Moster | B64C 39/024 |
| 2018/0233054 | A1* | 8/2018 | Woon | G08G 5/0069 |
| 2018/0253110 | A1* | 9/2018 | Tate | B64C 39/024 |
| 2018/0268721 | A1* | 9/2018 | McCullough | G08G 5/0021 |
| 2018/0275654 | A1* | 9/2018 | Merz | G08G 5/0086 |
| 2019/0122568 | A1* | 4/2019 | Nevdahs | G05D 1/106 |
| 2019/0130768 | A1* | 5/2019 | Clark | G08G 5/0039 |
| 2019/0220042 | A1* | 7/2019 | Guo | G08G 5/0026 |
| 2019/0250601 | A1* | 8/2019 | Donahoe | G05D 1/101 |
| 2019/0277645 | A1* | 9/2019 | Li | G01C 21/20 |
| 2020/0058224 | A1* | 2/2020 | Giona | G08G 5/0039 |
| 2020/0379488 | A1* | 12/2020 | Thirumalaivenjamur | B64C 30/00 |

OTHER PUBLICATIONS

"UgCS Desktop Application Version 2.12 User Manual", SPH Enginerring, 2017, p. 13. (Year: 2017).*

The First Chinese Office Action dated Nov. 3, 2020; Appln. No. 201910745608.X.

* cited by examiner

AIR LINE DISPLAYING METHOD, APPARATUS AND SYSTEM, GROUND STATION AND COMPUTER-READABLE STORAGE MEDIUM

CROSS-REFERENCE TO RELATED APPLICATION

The application claims priority of Germany Patent Application No. 102018120010.2, filed on Aug. 16, 2018, which is incorporated herein by reference in its entirety.

BACKGROUND

Technical Field

The present application relates to the field of unmanned aerial vehicle (UAV) technologies, and in particular, to an air line displaying method, apparatus and system, a ground station and a computer-readable storage medium.

Related Art

An aircraft may also be referred to as an UAV or a drone.

The aircraft is controlled by a ground station and can fly according to information sent by the ground station. The ground station can display a two-dimensional view. The two-dimensional view displays an air line of the UAV on which waypoints are marked. The two-dimensional view also displays a relative position relationship of the waypoints, a distance between the waypoints and position information of the waypoints, and the like.

However, the air line view displayed by the current ground station cannot be edited, so that it is inconvenient for a user to adjust the air line. Further, the aircraft cannot receive a new air line in time, thereby affecting flight of the aircraft.

SUMMARY

The present application provides an air line displaying method, apparatus and system, a ground station and a computer-readable storage medium, to resolve a problem that because an air line view displayed by a current ground station cannot be edited, it is inconvenient for a user to adjust an air line.

According to a first aspect, the present application provides an air line displaying method, including:

displaying a first air line view, the first air line view including height information of at least one waypoint in an air line;

when detecting a first operation performed by a user on a waypoint of the at least one waypoint, adjusting height information of the waypoint; and sending adjusted height information of the waypoint to an aircraft.

Optionally, the height information of the waypoint includes at least one of the following:

absolute height information and ground-relative height information of the waypoint and flight height range information, of the waypoint, relative to rest capacity of the aircraft.

Optionally, the first air line view further includes distance information between waypoints, the distance information between waypoints including at least one of the following:

distance information between a start waypoint and another waypoint and distance information between neighboring waypoints.

Optionally, the method further includes:

when detecting a second operation performed by the user on the waypoint of the at least one waypoint, displaying a height adjusting control relative to the waypoint;

the when detecting a first operation performed by a user on a waypoint of the at least one waypoint, adjusting height information of the waypoint includes:

when detecting a first operation performed by the user on the height adjusting control, adjusting the height information of the waypoint according to the first operation, and the method further includes:

displaying adjusted height information of the waypoint.

Optionally, the method further includes:

when detecting a third operation performed by the user on the waypoint of the at least one waypoint, adjusting a display position of the waypoint.

Optionally, the method further includes:

adjusting a waypoint execution sequence of the air line; and sending the adjusted waypoint execution sequence to the aircraft.

Optionally, the method further includes:

when detecting a fourth operation performed by the user on the first air line view, switching the first air line view to a second air line view in a dimension different from that of the first air line view.

Optionally, the method further includes:

when detecting a fifth operation performed by the user on the second air line view, switching a viewpoint of the second air line view.

According to a second aspect, the present application provides a ground station, including: a processor, a transmitter and a display, where the transmitter and the display are connected to the processor;

the display is configured to display a first air line view, the first air line view including height information of at least one waypoint in an air line;

the processor is configured to: when detecting a first operation performed by a user on a waypoint of the at least one waypoint, adjust height information of the waypoint; and the transmitter is configured to send adjusted height information of the waypoint to an aircraft.

Optionally, the height information of the waypoint includes at least one of the following: absolute height information and ground-relative height information of the waypoint and flight height range information, of the waypoint, relative to rest capacity of the aircraft.

Optionally, the first air line view further includes distance information between waypoints, the distance information between waypoints including at least one of the following:

distance information between a start waypoint and another waypoint and distance information between neighboring waypoints.

Optionally, the display is further configured to:

when detecting a second operation performed by the user on the waypoint of the at least one waypoint, display a height adjusting control relative to the waypoint;

the processor is specifically configured to:

when detecting a first operation performed by the user on the height adjusting control, adjust the height information of the waypoint according to the first operation, and the display is further configured to:

display adjusted height information of the waypoint.

Optionally, the processor is further configured to:

when detecting a third operation performed by the user on the waypoint of the at least one waypoint, adjust a display position of the waypoint.

Optionally, the processor is further configured to adjust a waypoint execution sequence of the air line; and the transmitter is further configured to send the adjusted waypoint execution sequence to the aircraft.

Optionally, the processor is further configured to:

when detecting a fourth operation performed by the user on the first air line view, switch the first air line view to a second air line view in a dimension different from that of the first air line view.

Optionally, the processor is further configured to:

when detecting a fifth operation performed by the user on the second air line view, switch a viewpoint of the second air line view.

According to a third aspect, the present application provides an air line displaying apparatus, including:

a first display module, configured to display a first air line view, the first air line view including height information of at least one waypoint in an air line;

a first adjustment module, configured to: when detecting a first operation performed by a user on a waypoint of the at least one waypoint, adjust height information of the waypoint; and a first sending module, configured to send adjusted height information of the waypoint to an aircraft.

Optionally, the height information of the waypoint includes at least one of the following: absolute height information and ground-relative height information of the waypoint and flight height range information, of the waypoint, relative to rest capacity of the aircraft.

Optionally, the first air line view further includes distance information between waypoints, the distance information between waypoints including at least one of the following: distance information between a start waypoint and another waypoint and distance information between neighboring waypoints.

Optionally, the apparatus further includes:

a second display module, configured to: when detecting a second operation performed by the user on the waypoint of the at least one waypoint, display a height adjusting control relative to the waypoint; and the first adjustment module is specifically configured to:

when detecting a first operation performed by the user on the height adjusting control, adjusting the height information of the waypoint according to the first operation, and the apparatus further includes:

a third display module, configured to display adjusted height information of the waypoint.

Optionally, the apparatus further includes:

a second adjustment module, configured to: when detecting a third operation performed by the user on the waypoint of the at least one waypoint, adjust a display position of the waypoint.

Optionally, the apparatus further includes:

a third adjustment module, configured to adjust a waypoint execution sequence of the air line; and a second sending module, configured to send the adjusted waypoint execution sequence to the aircraft.

Optionally, the apparatus further includes:

a first switch module, configured to: when detecting a fourth operation performed by the user on the first air line view, switch the first air line view to a second air line view in a dimension different from that of the first air line view.

Optionally, the apparatus further includes:

a second switch module, configured to: when detecting a fifth operation performed by the user on the second air line view, switch a viewpoint of the second air line view.

According to a fourth aspect, the present application provides an air line displaying system, including an aircraft and the ground station according to any implementation of the second aspect.

According to a fifth aspect, the present application provides a ground station, including a unit or means for performing the steps of any implementation of the first aspect.

According to a sixth aspect, the present application provides a ground station, including at least one processing element or chip for performing any implementation of the first aspect.

According to a seventh aspect, the present application provides a program. The program, when executed by a processor, is used for performing any implementation of the first aspect.

According to an eighth aspect, the present application provides a computer-readable storage medium including the program of the seventh aspect.

The technical effects of the present application are: The first air line view is displayed, the first air line view including the height information of the at least one waypoint in the air line; when the first operation performed by the user on the waypoint of the at least one waypoint is detected, the height information of the waypoint is adjusted; and the adjusted height information of the waypoint is sent to the aircraft. In this way, the ground station performs human-computer interaction with the user, to adjust the waypoints displayed on the air line view displayed by the ground station and further adjust the absolute height information, the ground-relative height information, the flight height range information, and the like of the waypoint. According to the method of adjusting the air line view through human-computer interaction, the air line view displayed by the ground station can be edited. This makes it convenient for the user to adjust the air line and further enables the aircraft to receive a new air line in time, thereby facilitating flight of the aircraft.

DETAILED DESCRIPTION

Figure 1:
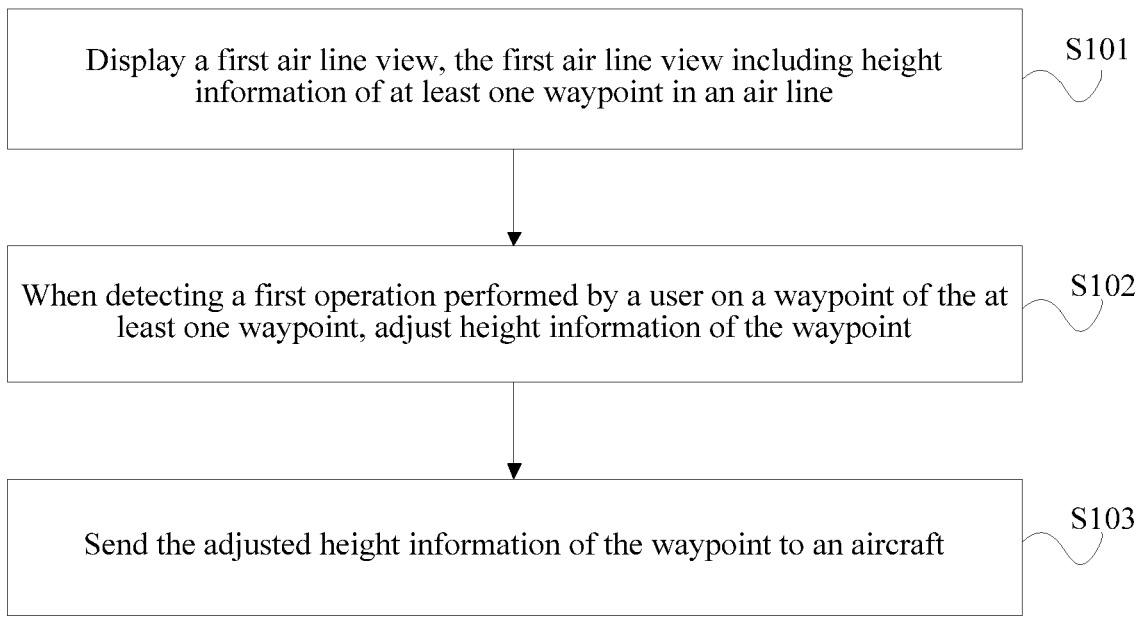
FIG. 1 is a schematic flowchart of an air line displaying method according to an embodiment of the present application.

Exemplary embodiments are described in detail herein, and examples of the exemplary embodiments are shown in the accompanying drawings. When the accompanying drawings are used in the following descriptions, unless indicated otherwise, same numbers in different accompanying drawings represent same or similar elements. The implementations described in the following exemplary embodiments do not necessarily represent all implementations that are the same as those of the present application. On the contrary, the implementations are merely examples of apparatuses and methods that are described in detail in the appended claims and that are consistent with some aspects of the present application.

The embodiments of the present application are applied to an UAV or a possible future aircraft. The UAV may include a fixed-wing UAV, a rotary-wing UAV, or the like. Some terms used in the present application are described below, to help a person skilled in the art to understand them. It should be noted that when the solutions in the embodiments of the present application are applied to the UAV or the possible future aircraft, names of a ground station, the aircraft, the UAV, a flight controller and a mission controller may undergo changes. However, implementations of the solutions in the embodiments of the present application are not affected by the changes.

The following describes the technical solutions in the embodiments of the present application with reference to the accompanying drawings.

First, the technical terms used in the present application are explained.

1) A ground station may also be referred to as a ground control device or a remote control. The ground station may send information and a control command to an UAV or may receive information such as flight data and images fed back by the UAV, or the like. The ground station may include a remote control, a user terminal or a device having functions of both. A UAV-related application program may be installed in the user terminal. The user terminal may be connected to a remote control of the UAV by executing the application program. Further, the user terminal may send a control instruction to the UAV by using the remote control or receive, by using the remote control, an image, flight data or the like fed back by the UAV. In addition, the user terminal may display the image or flight data. Alternatively, the user terminal may directly communicate with the UAV.

2) "A plurality of" refers to two or more. Other measure words are similar to this word.

It should be noted that, the nouns or terms used in the embodiments of the present application may be used as a reference for each other. Details are not described herein.

Due to the advantages such as having a relatively small volume, an UAV can be used in many fields for aerial photograph, news reporting, surveying and mapping, and the like. A ground station can display a two-dimensional view or three-dimensional view. The view displays an air line of the UAV on which waypoints are marked. The view also displays a relative position relationship of the waypoints, a distance between the waypoints and position information of the waypoints. However, because the view displayed by the ground station cannot be edited, a user cannot adjust the air line in time.

FIG. 1 is a schematic flowchart of an air line displaying method according to an embodiment of the present application. As shown in FIG. 1, the method can be applied to a ground station and includes:

S101: Display a first air line view, the first air line view including height information of at least one waypoint in an air line.

Optionally, the height information of the waypoint includes at least one of the following: absolute height information and ground-relative height information of the waypoint and flight height range information, of the waypoint, relative to rest capacity of an aircraft.

For example, the ground station may display an air line view of the aircraft, which may be referred to as a first air line view herein. The first air line view may include information about each waypoint such as height information, longitude and latitude information, waypoint distance information, absolute height information and ground-relative height information of the waypoint and flight height range information, of the waypoint, relative to rest capacity of the aircraft.

S102: When detecting a first operation performed by a user on a waypoint of the at least one waypoint, adjust height information of the waypoint.

For example, the user may adjust the first air line view through human-computer interaction. The user may input the first operation to the ground station by touching a touchscreen or a human-computer interaction interface of the ground station, performing gesture interaction, or the like. The first operation may include a touch operation, a gesture operation and the like. The first operation aims at one or more waypoints on the first air line view, so that the ground station adjusts height information of the one or more waypoints on the first air line view according to the first operation performed by the user.

S103: Send adjusted height information of the waypoint to an aircraft.

For example, in an implementation, after the ground station adjusts the height of the waypoint, the ground station may re-generate adjusted air line information and an adjusted air line view and may display the adjusted air line view. The adjusted air line information includes adjusted information about the waypoint such as adjusted height information, longitude and latitude information, waypoint distance information, absolute height information and ground-relative height information of the waypoint and flight height range information, of the waypoint, relative to rest capacity of the aircraft.

After the aircraft receives the adjusted air line information, the aircraft flies according to the air line information.

In another implementation, the ground station may send only the adjusted height information of the waypoint to the aircraft, so that the aircraft updates the height information of the waypoint.

Optionally, the ground station may send the adjusted height information of the waypoint to the aircraft before the aircraft takes off. Alternatively, the ground station may send the adjusted height information of the waypoint to the aircraft during flight of the aircraft. The aircraft may determine a flight height according to the adjusted height information of the waypoint, to fly according to the determined flight height at the waypoint.

In this embodiment, the first air line view is displayed, the first air line view including the height information of the at least one waypoint in the air line; when the first operation performed by the user on the waypoint of the at least one waypoint is detected, the height information of the waypoint is adjusted; and the adjusted height information of the waypoint is sent to the aircraft. In this way, the ground station performs human-computer interaction with the user, to adjust the waypoints displayed on the air line view displayed by the ground station and further adjust the absolute height information, the ground-relative height information, the flight height range information, and the like of the waypoint. According to the method of adjusting the air line view through human-computer interaction, the air line view displayed by the ground station can be edited. This makes it convenient for the user to adjust the air line and further enables the aircraft to receive a new air line in time, thereby facilitating flight of the aircraft.

Figure 2:
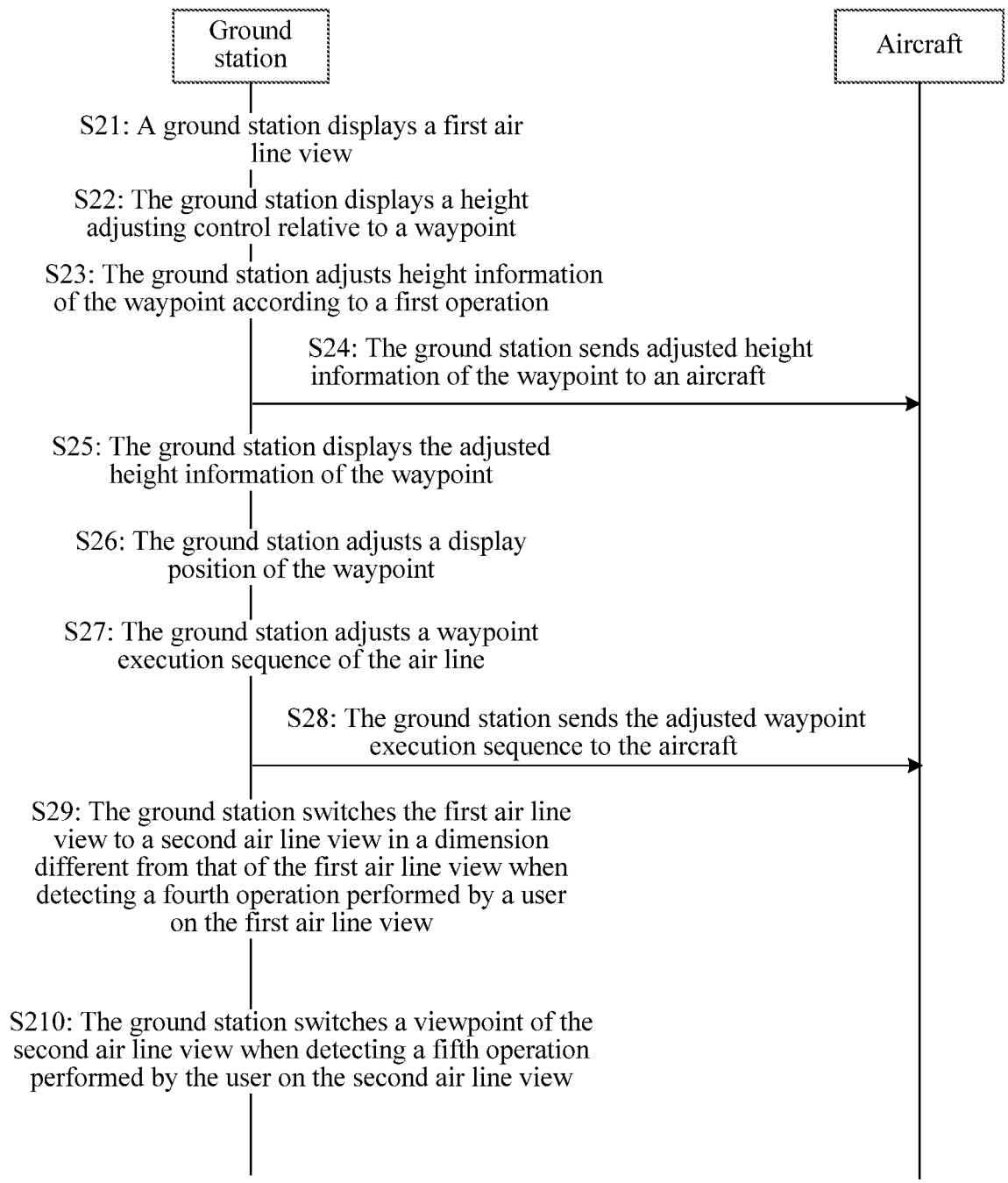
FIG. 2 is a signaling diagram of an air line displaying method according to an embodiment of the present application.

FIG. 2 is a signaling diagram of an air line displaying method according to an embodiment of the present application. As shown in FIG. 2, the method includes:

S21: A ground station displays a first air line view, the first air line view including height information of at least one waypoint in an air line.

Optionally, the first air line view further includes distance information between waypoints, the distance information between waypoints including at least one of the following: distance information between a start waypoint and another waypoint and distance information between neighboring waypoints.

Figure 3:
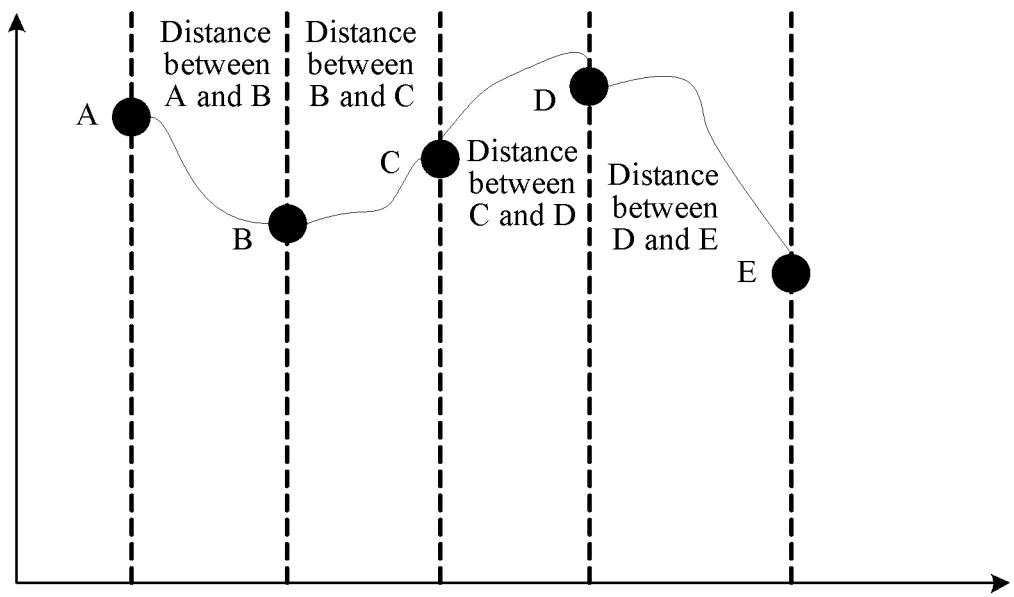
FIG. 3 is a schematic diagram 1 of a first air line view of an air line displaying method according to an embodiment of the present application.

For example, FIG. 3 is a schematic diagram 1 of a first air line view of an air line displaying method according to an embodiment of the present application. A y-axis may be used for representing height information of each waypoint. The height information herein may be an absolute height or ground-relative height information. Further, the first air line view may display a height of the ground, so that a user can directly observe the absolute height of the waypoint and a relative height between the waypoint and the ground. An x-axis may be used for representing distance information between the waypoints or be used for representing an execution sequence of the waypoints. For example, as shown in FIG. 3, the first air line view displays five waypoints. The first air line view may display height information of a waypoint A, height information of a waypoint B, height information of a waypoint C, height information of a waypoint D and height information of a waypoint E. The height information of the waypoints displayed herein may be absolute heights. As shown in FIG. 3, the first air line view may further display the execution sequence of the waypoints. For example, as shown in FIG. 3, the execution sequence of the waypoints may be sequentially the waypoint A-the waypoint B-the waypoint C-the waypoint D-the waypoint E. In addition, distance information between the waypoint A and the waypoint B, distance information between the waypoint B and the waypoint C, distance information between the waypoint C and the waypoint D and distance information between the waypoint D and the waypoint E may be displayed. Optionally, a distance between the waypoint A and the other waypoints may further be displayed.

Figure 4:
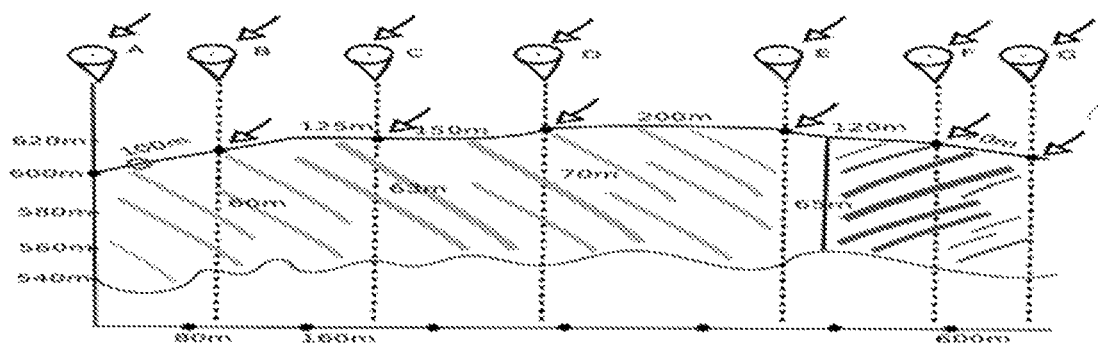
FIG. 4 is a schematic diagram 2 of a first air line view of an air line displaying method according to an embodiment of the present application.

For another example, FIG. 4 is a schematic diagram 2 of a first air line view of an air line displaying method according to an embodiment of the present application. As shown in FIG. 4, a y-axis represents an absolute height of a waypoint, and an x-axis may represent a distance between waypoints and a total length of an air line. FIG. 4 further displays an absolute height of the ground corresponding to the air line and a relative height between the air line and the ground. For example, on the first air line view, an absolute height of a waypoint A may be 600 m, a height of the ground corresponding to the waypoint A may be 540 m, and a relative height between the waypoint A and the ground may be 60 m. For another example, on the first air line view, a distance between the waypoints may be displayed. For example, a distance between the waypoint A and a waypoint B is 100 m. Further, a total length of the air line from the waypoint A to a waypoint G may be displayed by using numerical values on the x-axis. Further, FIG. 4 may further display an execution sequence of the waypoints on the air line. For example, the execution sequence of the waypoints on the air line is sequentially the waypoint A-the waypoint B-a waypoint C-a waypoint D-a waypoint E-a waypoint F-the waypoint G.

According to the foregoing manner, the user may directly observe heights of the waypoints and the distance between the waypoints, so that the air line information is visible, thereby improving user experience.

S22: The ground station displays, when detecting a second operation performed by a user on a waypoint of the at least one waypoint, a height adjusting control relative to the waypoint.

For example, when the user performs human-computer interaction with the ground station, the user may input the second operation to the ground station. The second operation aims at the at least one waypoint on the first air line view. When receiving the second operation performed by the user on the one or more waypoints, the ground station may display a height adjusting control of a waypoint to be adjusted by the user, that is, display height adjusting control of the one or more waypoints at which the user aims. The height adjusting control may be implemented by a height adjusting button, a height information input box, or the like. This is not limited herein.

Further, a display position of the height adjusting control on the air line view may be related to display positions of the one or more waypoints at which the user aims at. If the second operation aims at a plurality of waypoints, each waypoint may correspond to one height adjusting control, and a display position of the height adjusting control is related to a display position of a corresponding waypoint.

For example, after receiving the second operation performed by the user, the ground station may display one height adjusting control on the first air line view. Alternatively, after receiving the second operation performed by the user, the ground station displays a plurality of (for example, all) height adjusting controls on the first air line view.

Figure 5:
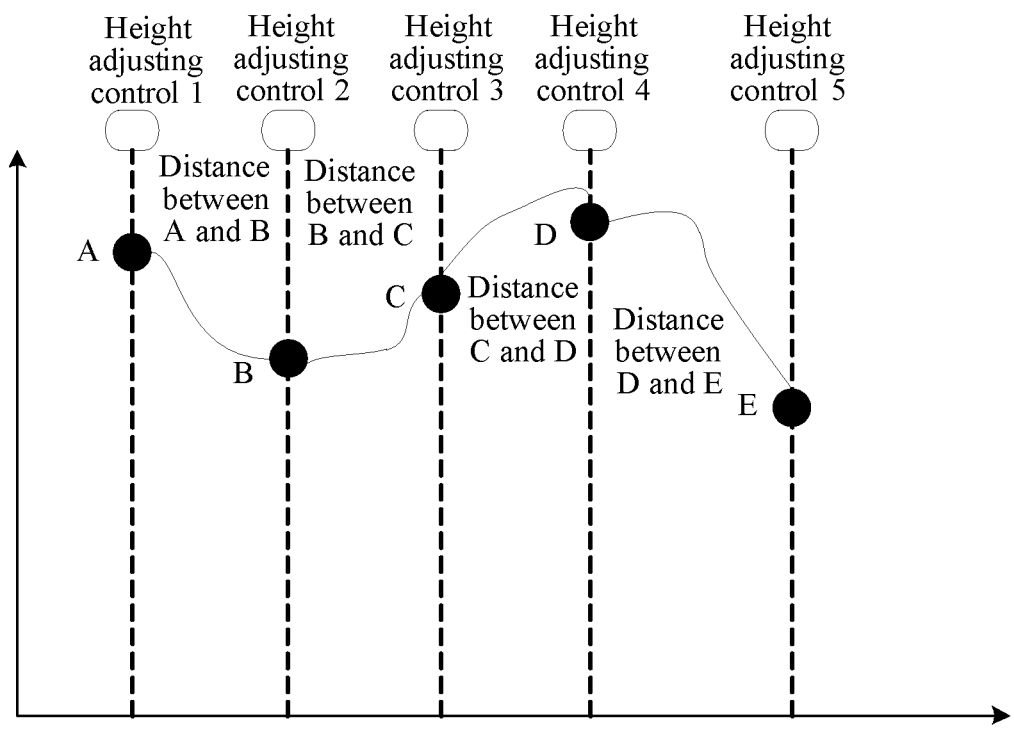
FIG. 5 is a schematic diagram 3 of a first air line view of an air line displaying method according to an embodiment of the present application.

As shown in FIG. 5, FIG. 5 is a schematic diagram 3 of a first air line view of an air line displaying method according to an embodiment of the present application. After receiving the second operation performed by the user, the ground station may display a height adjusting control 1 related to the waypoint A and a height adjusting control 2 related to the waypoint B. The ground station may display or not display a height adjusting control 3 related to the waypoint C, a height adjusting control 4 related to the waypoint D and a height adjusting control 5 related to the waypoint E.

Figure 6:
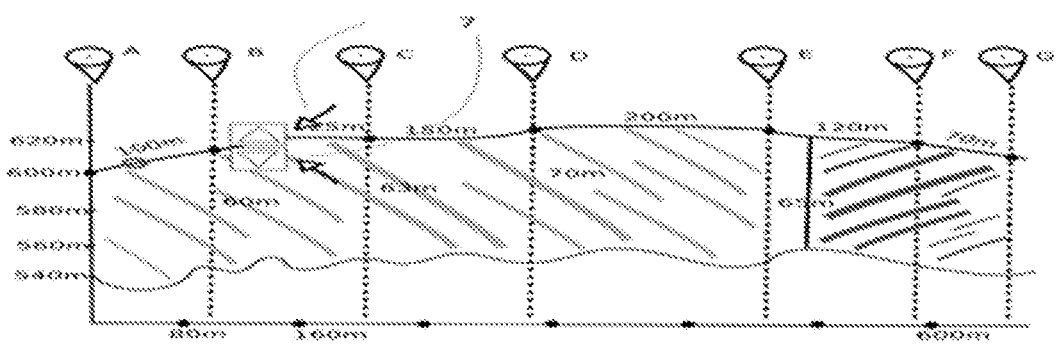
FIG. 6 is a schematic diagram 4 of a first air line view of an air line displaying method according to an embodiment of the present application.

As shown in FIG. 6, FIG. 6 is a schematic diagram 4 of a first air line view of an air line displaying method according to an embodiment of the present application. After receiving the second operation performed by the user, a waypoint at which the second operation aims may be determined according to an operation position of the second operation performed by the user. For example, as shown in FIG. 6, after receiving the second operation performed by the user, the ground station determines that the waypoint at which the second operation aims is the waypoint B according to the operation position of the second operation. For example, when the second operation is a touch operation, the operation position of the second operation is a touch coordinate of the touch operation on a touchscreen. For another example, when the second operation is a gesture operation, the operation position of the second operation is a coordinate of the gesture operation mapped on the first air line view. For example, if the operation position of the second operation is near a display position of the waypoint B, it can be determined that the waypoint at which the second operation aims is the waypoint B.

Alternatively, the waypoint at which the second operation aims is determined according to an operation track of the second operation. For example, if the operation track of the second operation is "B", it is determined that the waypoint at which the second operation aims is the waypoint B.

As shown in FIG. 6, a display position of the height adjusting control corresponding to the waypoint B is related to the display position of the waypoint B. In FIG. 6, the position of the height adjusting control is near the display position of the waypoint B. The height adjusting control may include a height increasing control and a height decreasing control. The user can adjust the height of the waypoint B by performing an operation on the height adjusting control, for example, performing the first operation. Correspondingly, the ground station may display the adjusted height of the waypoint B and a connection manner between the waypoint B and a neighboring waypoint on the first air line view in time.

Certainly, the ground station may further display a height adjusting control related to a waypoint in another manner and according to the second operation. This is not limited herein.

S23: The ground station adjusts, when detecting a first operation performed by the user on the height adjusting control, height information of the waypoint according to the first operation.

For example, after the ground station displays the information and the height adjusting control of each waypoint in the first air line view, the ground station may detect the first operation performed by the user on the height adjusting control. In FIG. 6, the first operation may be a touch operation on the height increasing control or may be a touch operation on the height decreasing control. Further, the ground station may adjust the height information of the waypoint according to the first operation. Herein, a ground-relative height may be adjusted, or an absolute height of the waypoint may be adjusted. This is not limited herein.

S24: The ground station sends adjusted height information of the waypoint to an aircraft.

For example, for this step, refer to step S103 in FIG. 1, and details are not described herein again.

S25: The ground station displays the adjusted height information of the waypoint.

For example, the ground station may re-generate an adjusted first air line view according to the adjusted height information of the waypoint. There is the adjusted height information of the waypoint on the adjusted first air line view.

Figure 7:
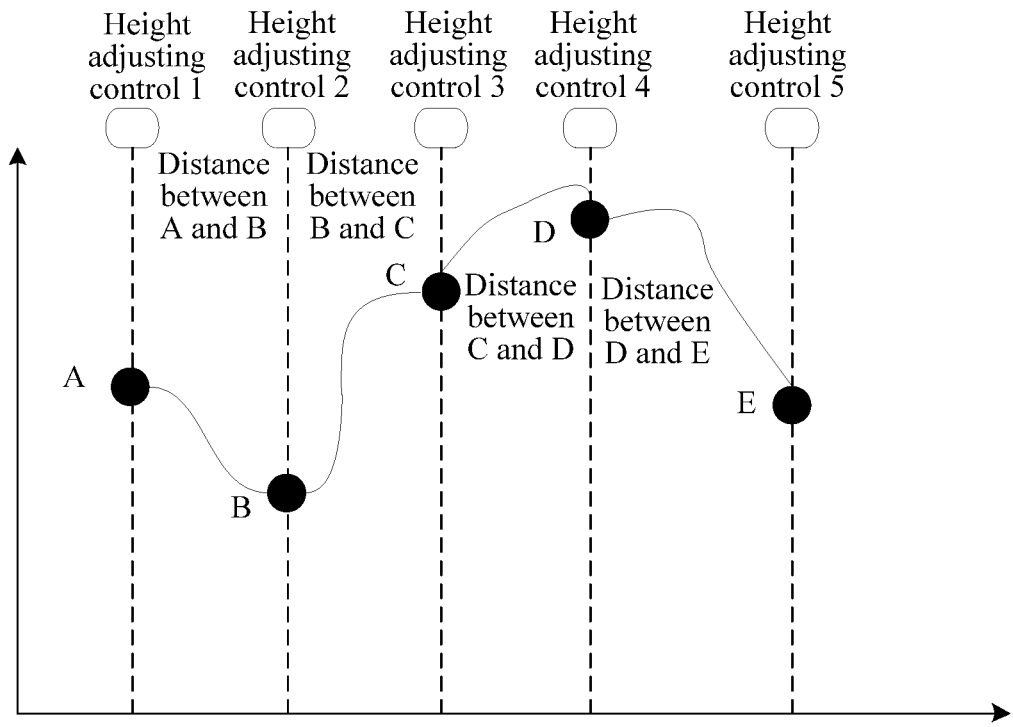
FIG. 7 is a schematic diagram 5 of a first air line view of an air line displaying method according to an embodiment of the present application.

For example, FIG. 7 is a schematic diagram 5 of a first air line view of an air line displaying method according to an embodiment of the present application. As shown in FIG. 7, for the first air line view displayed in FIG. 4, the height information of the waypoint A and that of the waypoint B are adjusted, and the ground station may display and process adjusted height information in a form of image or text.

A performing sequence of S24 and S25 in this embodiment of the present application is not limited. That is, S24 and S25 may be performed at the same time, or S24 may be performed before or after S25.

Optionally, this embodiment of the present application may further include steps S26 to S28.

S26: The ground station adjusts, when detecting a third operation performed by the user on the waypoint of the at least one waypoint, a display position of the waypoint.

For example, the user may further perform the third operation on the waypoints on the first air line view. The third operation aims at adjusting display positions of the waypoints, so that the ground station can adjust an execution sequence of the waypoints.

S27: The ground station adjusts a waypoint execution sequence of the air line.

For example, in step S26, the user adjusts positions of the waypoints on the first air line view, so that the ground station can adjust the waypoint execution sequence of the air line according to adjusted display positions of the waypoints.

Figure 8:
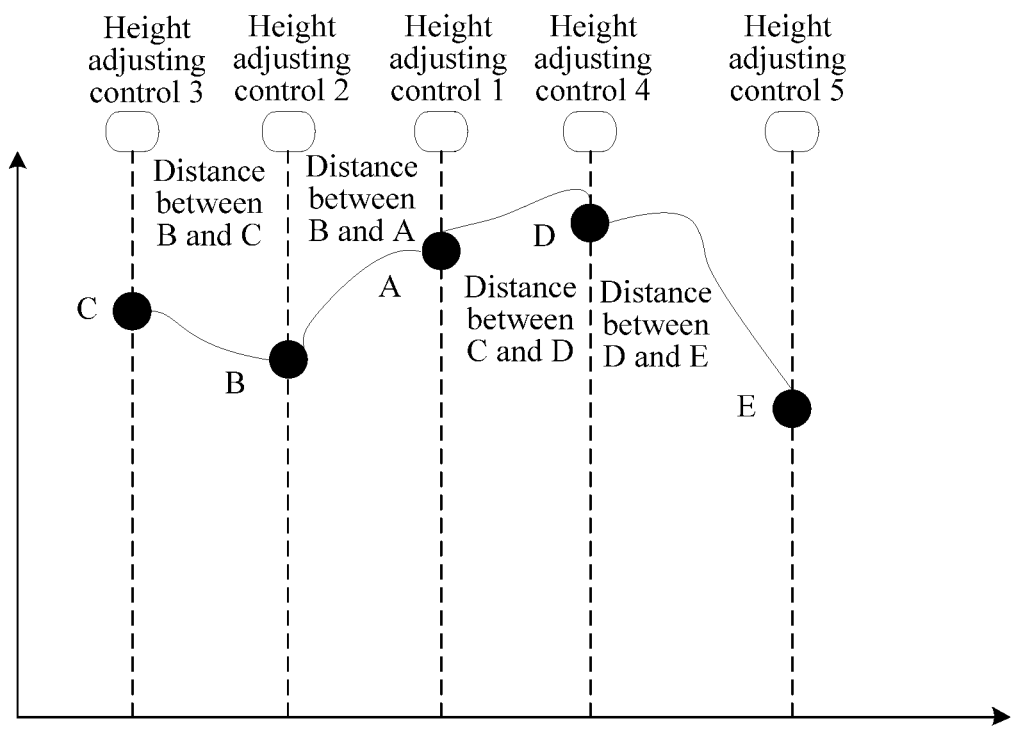
FIG. 8 is a schematic diagram 6 of a first air line view of an air line displaying method according to an embodiment of the present application.

For example, FIG. 8 is a schematic diagram 6 of a first air line view of an air line displaying method according to an embodiment of the present application. As shown in FIG. 8, relative to the first air line view displayed in FIG. 6 or FIG. 7, the first air line view displayed in FIG. 8 is a first air line view obtained after the ground station adjusts the display positions of the waypoints according to the third operation performed by the user. As shown in FIG. 8, the user may adjust a position relationship between the waypoint A and the waypoint C, so that the ground station can adjust an execution sequence of the waypoints. For example, as shown in FIG. 8, a new sequence obtained after the adjustment is the waypoint C, the waypoint B, the waypoint A, the waypoint D, and the waypoint E.

S28: The ground station sends the adjusted waypoint execution sequence to the aircraft.

For example, the ground station sends the height information of the waypoints and the waypoint execution sequence on the adjusted first air line view to the aircraft, so that the aircraft flies according to the adjusted waypoint execution sequence.

Optionally, this embodiment of the present application may further include steps S29 and S210.

S29: The ground station switches the first air line view to a second air line view in a dimension different from that of the first air line view when detecting a fourth operation performed by the user on the first air line view.

For example, the user may perform the fourth operation on the first air line view. The fourth operation is used for instructing the ground station to switch the first air line view to the second air line view. A dimension of the second air line view is different from a dimension of the first air line view. For example, the first air line view is two-dimensional and the second air line view is three-dimensional; the first air line view is three-dimensional and the second air line view is two-dimensional. When the first air line view is a two-dimensional view and the second air line view is a three-dimensional view, the ground station may switch the first air line view to the second air line view after detecting the fourth operation performed by the user. In this way, the user can directly observe a three-dimensional air line view during flight of the aircraft, thereby improving user experience.

Figure 9:
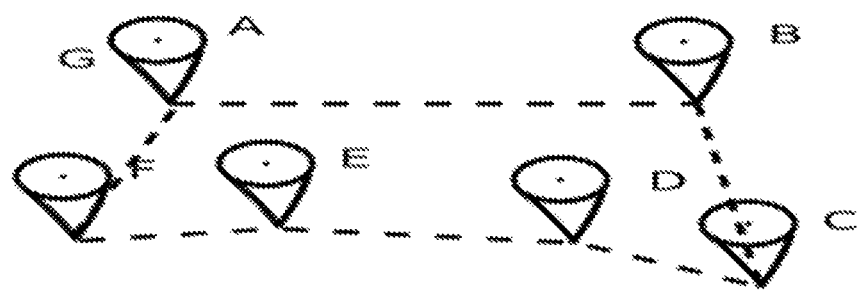
FIG. 9 is a schematic diagram 1 of a second air line view of an air line displaying method according to an embodiment of the present application.

For example, FIG. 9 is a schematic diagram 1 of a second air line view of an air line displaying method according to an embodiment of the present application. As shown in FIG. 9, the user may input the fourth operation to the ground station to instruct the ground station to switch the first air line view to the second air line view, for example, switch the first air line view shown in FIG. 4 to the second air line view shown in FIG. 9. Certainly, when displaying the second air line view, the ground station may receive a switch operation performed by the user to switch the second air line view to the first air line view.

S210: The ground station switches a viewpoint of the second air line view when detecting a fifth operation performed by the user on the second air line view.

For example, the user may perform the fifth operation on the second air line view. The fifth operation is used for instructing the ground station to switch a viewpoint of the second air line view. For example, the ground station may switch a current viewpoint of the second air line view from a viewpoint of the waypoint A to a viewpoint of the waypoint B.

Figure 10:
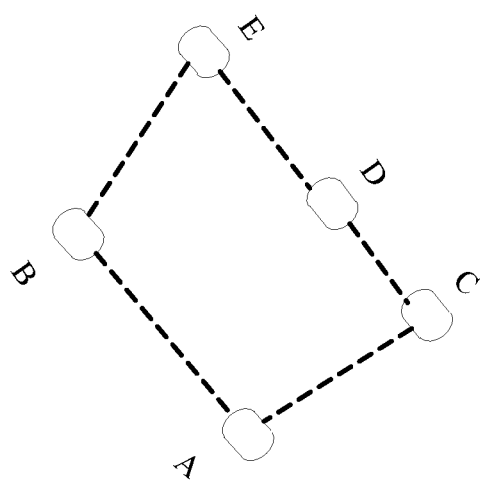
FIG. 10 is a schematic diagram 2 of a second air line view of an air line displaying method according to an embodiment of the present application.
Figure 11:
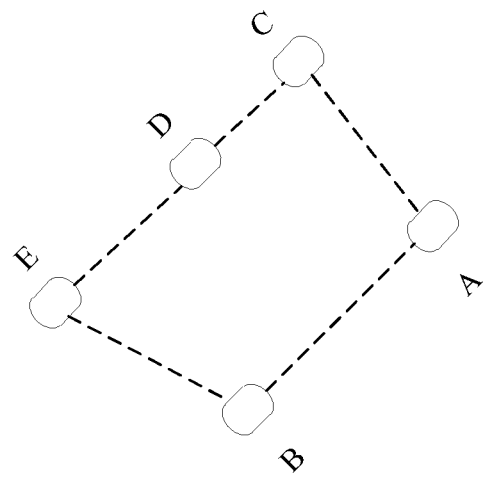
FIG. 11 is a schematic diagram 3 of a second air line view of an air line displaying method according to an embodiment of the present application.

For example, FIG. 10 is a schematic diagram 2 of a second air line view of an air line displaying method according to an embodiment of the present application, and FIG. 11 is a schematic diagram 3 of a second air line view of an air line displaying method according to an embodiment of the present application. As shown in FIG. 10 and FIG. 11, the user may input an instruction to the ground station, to instruct the ground station to switch the viewpoint of the second air line view from the waypoint A to the waypoint B. In this way, the user may observe the air line from a plurality of angles, thereby improving user experience.

Further, the user may further perform a check operation on a waypoint on the second air line view, so that the ground station displays, according to the check operation performed by the user, information about the waypoint such as height information or a waypoint identifier.

Further, the user may further perform an adjustment operation on the waypoint on the second air line view, so that the ground station can adjust a display position of the waypoint according to adjustment operation performed by the user and can further adjust an execution sequence on the waypoints.

In this embodiment, the user may adjust the height information and the waypoint execution sequence of the waypoints on the first air line view, switch the first air line view to the second air line view in a dimension different from that of the first air line view and switch the viewpoint of the second air line view. This implements human-computer interaction between the ground station and the user and adjusts the air line view and the waypoints on the air line view displayed in the ground station. According to the method of adjusting the air line view through human-computer interaction, the air line view displayed by the ground station can be edited. This makes it convenient for the user to adjust the air line and further enables the aircraft to receive a new air line in time, thereby facilitating flight of the aircraft.

Figure 12:
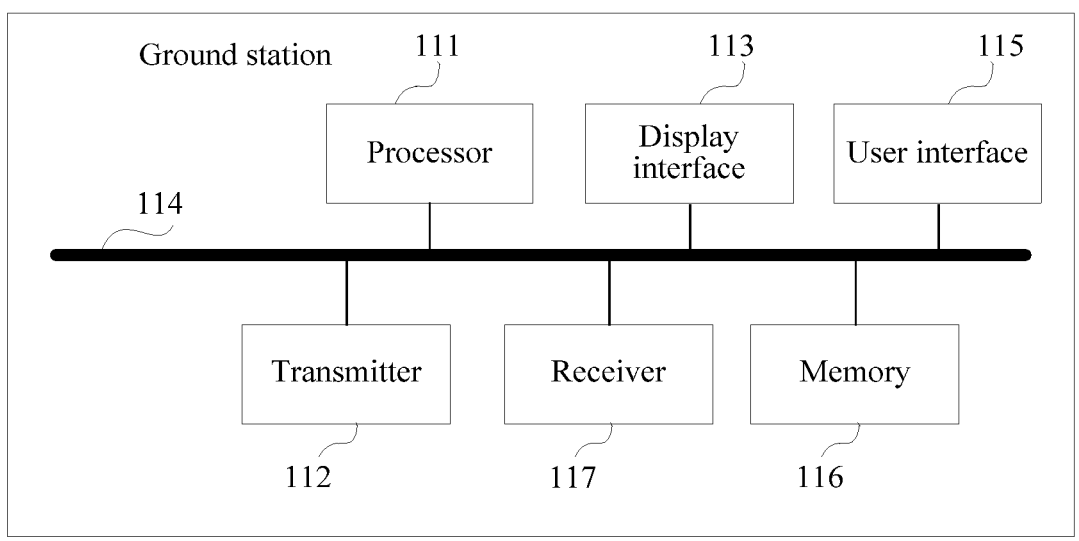
FIG. 12 is a schematic structural diagram of a ground station according to an embodiment of the present application.

FIG. 12 is a schematic structural diagram of a ground station according to an embodiment of the present application. As shown in FIG. 12, the ground station includes: a processor 111, a transmitter 112 and a display 113.

The transmitter 112 and the display 113 are connected to the processor 111.

The display 113 is configured to display a first air line view, the first air line view including height information of at least one waypoint in an air line.

The processor 111 is configured to: when detecting a first operation performed by a user on a waypoint of the at least one waypoint, adjust height information of the waypoint.

The transmitter 112 is configured to send adjusted height information of the waypoint to an aircraft.

Optionally, the height information of the waypoint includes at least one of the following: absolute height information and ground-relative height information of the waypoint and flight height range information, of the waypoint, relative to rest capacity of the aircraft.

Optionally, the first air line view further includes distance information between waypoints; the distance information between waypoints including at least one of the following: distance information between a start waypoint and another waypoint and distance information between neighboring waypoints.

Optionally, the display 113 is further configured to: when detecting a second operation performed by the user on the waypoint of the at least one waypoint, display a height adjusting control relative to the waypoint.

The processor 111 is specifically configured to: when detecting a first operation performed by the user on the height adjusting control, adjust the height information of the waypoint according to the first operation.

The display 113 is further configured to display adjusted height information of the waypoint.

Optionally, the processor 111 is further configured to:
when detecting a third operation performed by the user on the waypoint of the at least one waypoint, adjust a display position of the waypoint.

Optionally, the processor 111 is further configured to adjust a waypoint execution sequence of the air line.

The transmitter 112 is further configured to send adjusted waypoint execution sequence to the aircraft.

Optionally, the processor 111 is further configured to:
when detecting a fourth operation performed by the user on the first air line view, switch the first air line view to a second air line view in a dimension different from that of the first air line view.

Optionally, the processor 111 is further configured to:
when detecting a fifth operation performed by the user on the second air line view, switch a viewpoint of the second air line view.

For example, for this embodiment, refer to the steps in FIG. 1 to FIG. 10, and details are not described herein again.

Optionally, the ground station may further include a bus 114. The processor 111 and the transmitter 112 may be connected to each other by using the bus. The bus 114 may be a peripheral component interconnect (PCI) bus, an extended industry standard architecture (EISA) bus, or the like. The bus 114 may be classified into an address bus, a data bus, a control bus, and the like. For ease of representation, only one bold line is used for representation in FIG. 12, but it does not represent that there is only one bus or one type of bus.

Optionally, the ground station may further include a user interface 115, a memory 116 and a receiver 117. The user interface 115 is configured to receive an instruction sent by a user, and is, for example, a keyboard, a mouse, a camera apparatus, or a touchscreen. The memory 116 is configured to store information. The receiver 116 is configured to receive information sent by the aircraft.

The foregoing embodiments of the present application may be used as a reference for each other, and details of same or similar steps and terms are not described herein again.

Alternatively, all or some of the foregoing modules may be embedded on a chip of the ground station in a form of an integrated circuit for implementation. In addition, the modules may exist alone or may be integrated. That is, these modules may be configured to be one or more integrated circuits, for example, one or more application-specific integrated circuits (ASIC) or one or more processing units for implementing the foregoing methods. The one or more processing units may be a general purpose processing unit such as a central processing unit 111, a dedicated processing unit such as a digital signal processor 111, one or more field programmable gate arrays (FPGA), or the like.

For this embodiment, refer to the technical solutions in the foregoing embodiments, and the implementation principles and technical effects thereof are similar. Details are not described herein again.

Figure 13:
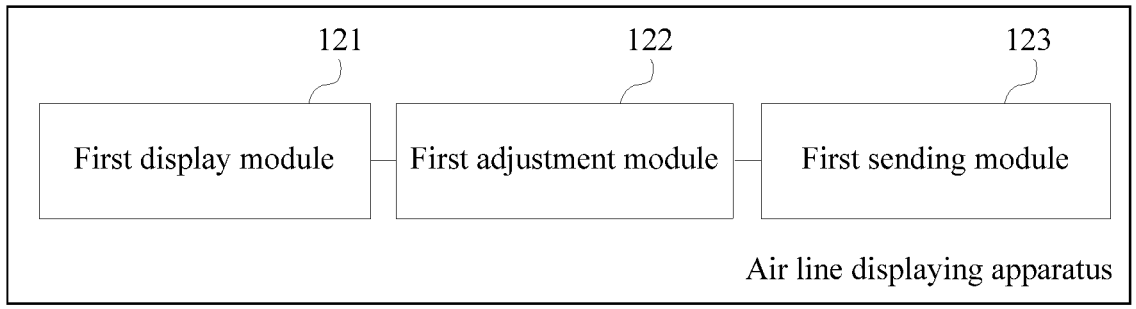
FIG. 13 is a schematic structural diagram of an air line displaying apparatus according to an embodiment of the present application.

FIG. 13 is a schematic structural diagram of an air line displaying apparatus according to an embodiment of the present application. The air line displaying apparatus is applied to a ground station. The apparatus includes:

a first display module 121, configured to display a first air line view, the first air line view including height information of at least one waypoint in an air line;

a first adjustment module 122, configured to: when detecting a first operation performed by a user on a waypoint of the at least one waypoint, adjust height information of the waypoint; and a first sending module 123, configured to send adjusted height information of the waypoint to an aircraft.

For this embodiment, refer to the technical solutions in the foregoing embodiments, and the implementation principles and technical effects thereof are similar. Details are not described herein again.

Figure 14:
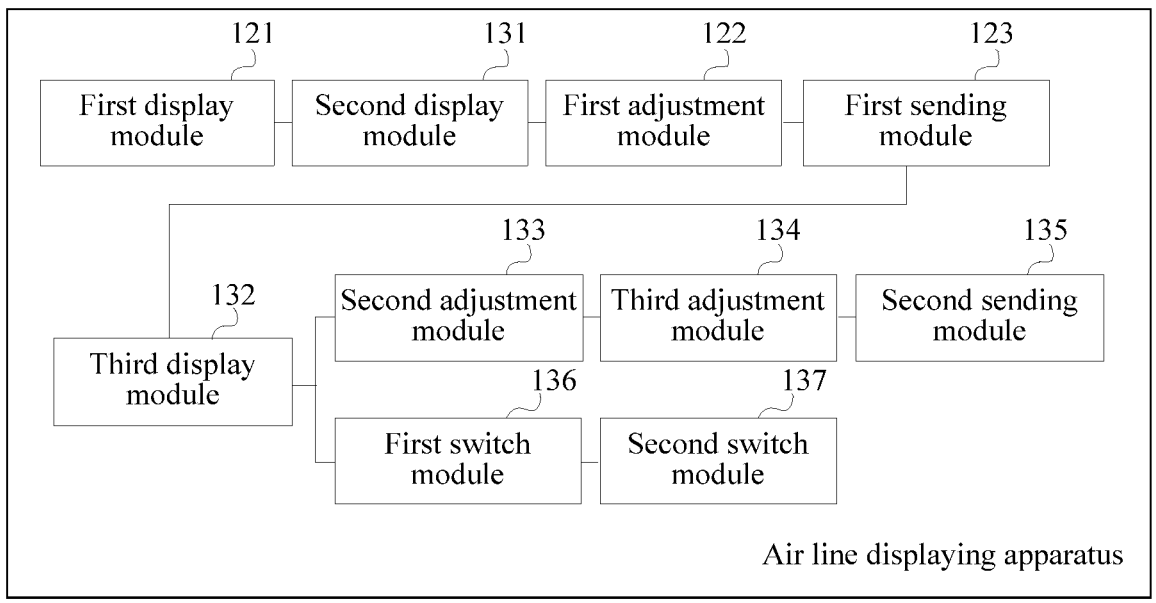
FIG. 14 is a schematic structural diagram of an air line displaying apparatus according to an embodiment of the present application.

FIG. 14 is a schematic structural diagram of an air line displaying apparatus according to an embodiment of the present application. Based on the embodiment shown in FIG. 12, the air line displaying apparatus is applied to the ground station, and the height information of the waypoint includes at least one of the following: absolute height information and ground-relative height information of the waypoint and flight height range information, of the waypoint, relative to rest capacity of the aircraft.

The first air line view further includes distance information between waypoints, the distance information between waypoints including at least one of the following: distance information between a start waypoint and another waypoint and distance information between neighboring waypoints.

The apparatus provided in this embodiment further includes:

a second display module 131, configured to: when detecting a second operation performed by the user on the waypoint of the at least one waypoint, display a height adjusting control relative to the waypoint; and the first adjustment module 122 is specifically configured to:

when detecting a first operation performed by the user on the height adjusting control, adjust the height information of the waypoint according to the first operation.

The apparatus provided in this embodiment further includes:

a third display module 132, configured to display adjusted height information of the waypoint.

The apparatus provided in this embodiment further includes:

a second adjustment module 133, configured to: when detecting a third operation performed by the user on the waypoint of the at least one waypoint, adjust a display position of the waypoint.

The apparatus provided in this embodiment further includes:

a third adjustment module 134, configured to adjust a waypoint execution sequence of the air line; and a second sending module 135, configured to send adjusted waypoint execution sequence to the aircraft.

The apparatus provided in this embodiment further includes:

a first switch module 136, configured to: when detecting a fourth operation performed by the user on the first air line view, switch the first air line view to a second air line view in a dimension different from that of the first air line view.

The apparatus provided in this embodiment further includes:

a second switch module 137, configured to: when detecting a fifth operation performed by the user on the second air line view, switch a viewpoint of the second air line view.

For this embodiment, refer to the technical solutions in the foregoing embodiments, and the implementation principles and technical effects thereof are similar. Details are not described herein again.

The foregoing functional modules may be implemented by using any or a combination of hardware, firmware or software. This is not limited herein.

The foregoing air line displaying apparatus may be implemented by using the foregoing ground station or integrated into the ground station. This is not limited herein.

An embodiment of the present application provides an air line information transmission system. The system includes an aircraft and the ground station provided in the foregoing embodiments. The ground station is configured to implement the air line information displaying method in the foregoing embodiments.

All or some of the foregoing embodiments may be implemented by using software, hardware, firmware, or any combination thereof. When the embodiments are implemented by using software, the embodiments may be completely or partially implemented in a form of a computer program product. The computer program product includes one or more computer instructions. When the computer instructions are loaded and executed on a computer, the procedures or functions according to the embodiments of the present application are all or partially generated. The computer may be a general purpose computer, a dedicated computer, a computer network, or another programmable apparatus. The computer instructions may be stored in a computer-readable storage medium or is transmitted from one computer-readable storage medium to another computer-readable storage medium. For example, the computer instructions may be transmitted from one website, computer, server or data center to another website, computer, server or data center in a wired (for example, a coaxial cable, an optical fiber, or a digital subscriber line (digital subscriber line, DSL)) or wireless (for example, infrared, radio, or microwave) manner. The computer-readable storage medium may be any available medium that a computer can access or a data storage device such as a server or a data center that includes one or more integrated available media. The available medium may be a magnetic medium (such as a soft disk, a hard disk, or a magnetic tape), an optical medium (such as a DVD), a semiconductor medium (such as a solid state disk (SSD)), or the like.

A person skilled in the art should be aware that in the foregoing one or more examples, functions described in the embodiments of the present application may be implemented by using hardware, software, firmware, or any combination thereof. When being implemented by using software, the foregoing functions may be stored in a computer-readable medium or transmitted as one or more instructions or code in the computer-readable medium. The computer-readable medium includes a computer storage medium and a communications medium. The communications medium includes any medium that facilitates a computer program to be transmitted from one place to another. The storage medium may be any available medium accessible to a general-purpose or dedicated computer.

What is claimed is:

1. An air line displaying method, comprising: displaying a first air line view on a display of a ground station, the first air line view comprising height information of a plurality of waypoints in an air line;
   detecting an operation performed by a user on a first waypoint and a second waypoint of the plurality of waypoints, display a first height adjusting control near the first waypoint and a second height adjusting control near the second waypoint on the display in response to the operation;
   detecting a height adjusting operation performed by the user on the first height adjusting control corresponding to the first waypoint and the second height adjusting control corresponding to the second waypoint, adjust the height information for the first and second waypoints according to the height adjusting operation; and
   sending adjusted height information of the first and second waypoints to an aircraft.

2. The method according to claim 1, wherein the first air line view further comprises distance information between waypoints,
   the distance information between waypoints comprising at least one of the following:
   distance information between a start waypoint and another waypoint and distance information between neighboring waypoints.

3. The method according to claim 1, wherein the method further comprises: displaying the adjusted height information of the first and second waypoints on the display.

4. The method according to claim 1, wherein the method further comprises: detecting a third operation performed by the user on a third waypoint of the plurality of waypoints, to adjust a display position of the third waypoint.

5. The method according to claim 4, wherein the method further comprises: adjusting a waypoint execution sequence of the air line in response to the third operation; and sending the adjusted waypoint execution sequence to the aircraft.

6. The method according to claim 1, wherein the method further comprises: detecting a fourth operation performed by the user on the first air line view, switching the first air line view to a second air line view in a dimension different from that of the first air line view.

7. The method according to claim 6, wherein the method further comprises: detecting a fifth operation performed by the user on the second air line view, switching a viewpoint of the second air line view to another viewpoint.

8. The method according to claim 1, wherein the height information of the plurality of waypoints comprises at least one of the following: absolute height information and ground-relative height information of the plurality of waypoints and flight height range information of the plurality of waypoints, relative to rest capacity of the aircraft.

9. A ground station, comprising: a processor, a transmitter and a display, wherein the transmitter and the display are connected to the processor; the display is configured to display a first air line view, the first air line view comprising height information of a plurality of waypoints in an air line; the processor is configured to:
   detecting an operation performed by a user on a first waypoint and a second waypoint of the plurality of waypoints, display a first height adjusting control near the first waypoint and a second height adjusting control near the second waypoint on the display in response to the operation;
   detecting a height adjusting operation performed by the user on the first height adjusting control corresponding to the first waypoint and the second height adjusting control corresponding to the second waypoint, adjust the height information for the first and second waypoints according to the height adjusting operation; and
   sending adjusted height information of the first and second waypoints to an aircraft by the transmitter.

10. The ground station according to claim 9, wherein the first air line view further comprises distance information between waypoints,
   the distance information between waypoints comprising at least one of the following:
   distance information between a start waypoint and another waypoint and distance information between neighboring waypoints.

11. The ground station according to claim 9, wherein the display is further configured to: display the adjusted height information of the first and second waypoints.

12. The ground station according to claim 9, wherein the processor is further configured to: detecting a third operation performed by the user on a third waypoint of the plurality of waypoints, adjust a display position of the third waypoint.

13. The ground station according to claim 12, wherein the processor is further configured to: adjust a waypoint execution sequence of the air line in response to the third operation; and send the adjusted waypoint execution sequence to the aircraft by the transmitter.

14. The ground station according to claim 9, wherein the processor is further configured to: detecting a fourth operation performed by the user on the first air line view, switch the first air line view to a second air line view in a dimension different from that of the first air line view.

15. The ground station according to claim 14, wherein the processor is further configured to: detecting a fifth operation performed by the user on the second air line view, switch a viewpoint of the second air line view to another viewpoint.

16. The ground station according to claim 9, wherein the height information of the plurality of waypoints comprises at least one of the following: absolute height information and ground-relative height information of the plurality of waypoints and flight height range information of the plurality of waypoints, relative to rest capacity of the aircraft.

* * * * *